US009599714B2

(12) United States Patent
Imaki et al.

(10) Patent No.: US 9,599,714 B2
(45) Date of Patent: Mar. 21, 2017

(54) WIND MEASUREMENT COHERENT LIDAR

(71) Applicant: Mitsubishi Electric Corporation, Tokyo (JP)

(72) Inventors: Masaharu Imaki, Tokyo (JP); Shumpei Kameyama, Tokyo (JP); Nobuki Kotake, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 244 days.

(21) Appl. No.: 14/391,252

(22) PCT Filed: Apr. 5, 2013

(86) PCT No.: PCT/JP2013/060483
§ 371 (c)(1),
(2) Date: Oct. 8, 2014

(87) PCT Pub. No.: WO2014/002564
PCT Pub. Date: Jan. 3, 2014

(65) Prior Publication Data
US 2015/0331110 A1  Nov. 19, 2015

(30) Foreign Application Priority Data

Jun. 25, 2012  (JP) ................. 2012-142086

(51) Int. Cl.
*G01S 17/58* (2006.01)
*G01S 17/95* (2006.01)
(52) U.S. Cl.
CPC .............. *G01S 17/58* (2013.01); *G01S 17/95* (2013.01)
(58) Field of Classification Search
CPC . G01P 5/26; G01S 7/497; G01S 17/95; G01S 17/58; G01S 17/102
See application file for complete search history.

(56) References Cited

U.S. PATENT DOCUMENTS

2002/0126039 A1  9/2002  Dalton et al.
2006/0100867 A1  5/2006  Lee et al.
(Continued)

FOREIGN PATENT DOCUMENTS

JP  2001-174216 A  6/2001
JP  2001-208836 A  8/2001
(Continued)

OTHER PUBLICATIONS

The extended European search report issued by the European Patent Office on Nov. 6, 2015, which corresponds to European Patent Application No. 13810413.8-1812 and is related to U.S Appl. No. 14/391,252.
(Continued)

*Primary Examiner* — Luke Ratcliffe
(74) *Attorney, Agent, or Firm* — Studebaker & Brackett PC

(57) ABSTRACT

A noise spectral differential unit records a noise spectrum in a state without any received signal, and subtracts the noise spectrum from a received signal spectrum. An offset corrector performs offset correction of the signal spectrum obtained by subtracting the noise spectrum by the noise spectral differential unit with respect to the noise level at a frequency separated from the frequency peak position of the received signal by a prescribed value. A frequency shift analyzer executes signal processing of the signal spectrum resulting after the offset correction and measures a frequency shift. A wind velocity converter makes wind velocity detection from the frequency shift measured by the frequency shift analyzer.

5 Claims, 4 Drawing Sheets

(56) References Cited

U.S. PATENT DOCUMENTS

2007/0058156 A1* 3/2007 Ando .................. G01P 5/26
356/28
2008/0059098 A1 3/2008 Zhang

FOREIGN PATENT DOCUMENTS

| JP | 2006-129464 A | 5/2006 |
| JP | 2009-162678 A | 7/2009 |
| JP | 2012-026791 A | 2/2012 |
| WO | 2005/114253 A1 | 12/2005 |
| WO | 2006/030502 A1 | 3/2006 |

OTHER PUBLICATIONS

Hildebrand, Peter H. et al.; "Objective Determination of the Noise Level in Doppler Spectra"; Journal of Applied Meteorology; Oct. 31, 1974; pp. 808-811.
An Office Action; "Notice of Reason for Rejection," issued by the Japanese Patent Office on Jan. 27, 2015, which corresponds to Japanese Patent Application No. 2014-522455 and is related to U.S. Appl. No. 14/391,252; with English language translation.
International Search Report; PCT/JP2013/060483; Jul. 16, 2013.

\* cited by examiner

WIND MEASUREMENT COHERENT LIDAR

TECHNICAL FIELD

The present invention relates to a wind measurement coherent lidar that emits laser light of a single frequency into the atmosphere and receives the laser light, and carries out wind velocity detection from the received signal obtained through heterodyne detection, and particularly to a wind measurement coherent lidar capable of accurately measuring the peak frequency and width of a received spectrum even when a noise level of a received system fluctuates owing to the change in temperature and variations in the power of local light.

BACKGROUND ART

A wind measurement coherent lidar emits optical pulses into the atmosphere, and receives scattered light from aerosol. It obtains the Doppler shift resulting from movement of aerosol through heterodyne detection between the seed light and the scattered light of the transmission optical pulses, and measures the wind in the direction of the laser radiation. The lidar derives the Doppler shift from the peak frequency of the signal passing through the heterodyne detection and FFT processing, and derives the wind velocity width (degree of turbulence in a wind field) from the frequency width.

As a conventional lidar for wind measurement, an instrument described in Patent Document 1 is known, for example. The instrument utilizes foresight information on a wind field, and carries out wind velocity measurement at high accuracy at low SN ratio.

PRIOR ART DOCUMENT

Patent Document

Patent Document 1: Japanese Patent Laid-Open No. 2009-162678.

DISCLOSURE OF THE INVENTION

Problems to be Solved by the Invention

A common wind measurement coherent lidar performs heterodyne detection between single-frequency continuous-wave light called local light and scattered light received from aerosol and the like suspended in the atmosphere, and derives the peak value of the received signal in the frequency domain using a barycentric operation, thereby measuring the wind velocity in the atmosphere from the amount of its frequency shift. On this occasion, the level of a noise spectrum at the frequency analysis fluctuates owing to power fluctuations of the continuous wave light and to gain changes due to temperature fluctuates of an optical receiver. The lidar described in the conventional Patent Document 1 described above has a problem in that when the level fluctuations occur in the noise spectrum, they can cause an error in the peak frequency position detected at the barycentric operation in the frequency domain, and exert an influence on the measured value of the wind velocity as an offset error.

The present invention is implemented to solve the foregoing problem. Therefore it is an object of the present invention to provide a wind measurement coherent lidar capable of carrying out wind velocity measurement at high accuracy even if the noise spectrum has level fluctuations.

Means for Solving the Problem

A wind measurement coherent lidar in accordance with the present invention comprises, in a wind measurement coherent lidar that emits laser light with a single frequency into the atmosphere and receives the laser light, and that carries out wind velocity detection from a received signal obtained through heterodyne detection, a noise spectral recorder that records a noise spectrum in a state without the received signal; a noise spectral differential unit that subtracts the noise spectrum from a spectrum of the received signal; an offset corrector that performs offset correction of a signal spectrum, which is obtained by subtracting the noise spectrum, with respect to a noise level at a frequency separated from a frequency peak position of the received signal by a prescribed value; a frequency shift analyzer that measures a frequency shift by performing signal processing of the signal spectrum after the offset correction; and a wind velocity converter that detects wind velocity from an amount of the frequency shift.

Advantages of the Invention

The wind measurement coherent lidar in accordance with the present invention records the noise spectrum in the state without any received signal, subtracts the noise spectrum from the spectrum of the received signal, and carries out the offset correction of the signal spectrum with reference to the noise level at the frequency separated from the frequency peak position by the prescribed value. Accordingly, it can perform the wind velocity measurement at high accuracy even if the noise spectrum has level fluctuations.

BEST MODE FOR CARRYING OUT THE INVENTION

The best mode for carrying out the invention will now be described with reference to the accompanying drawings to explain the present invention in more detail.

Embodiment 1

Figure 1:
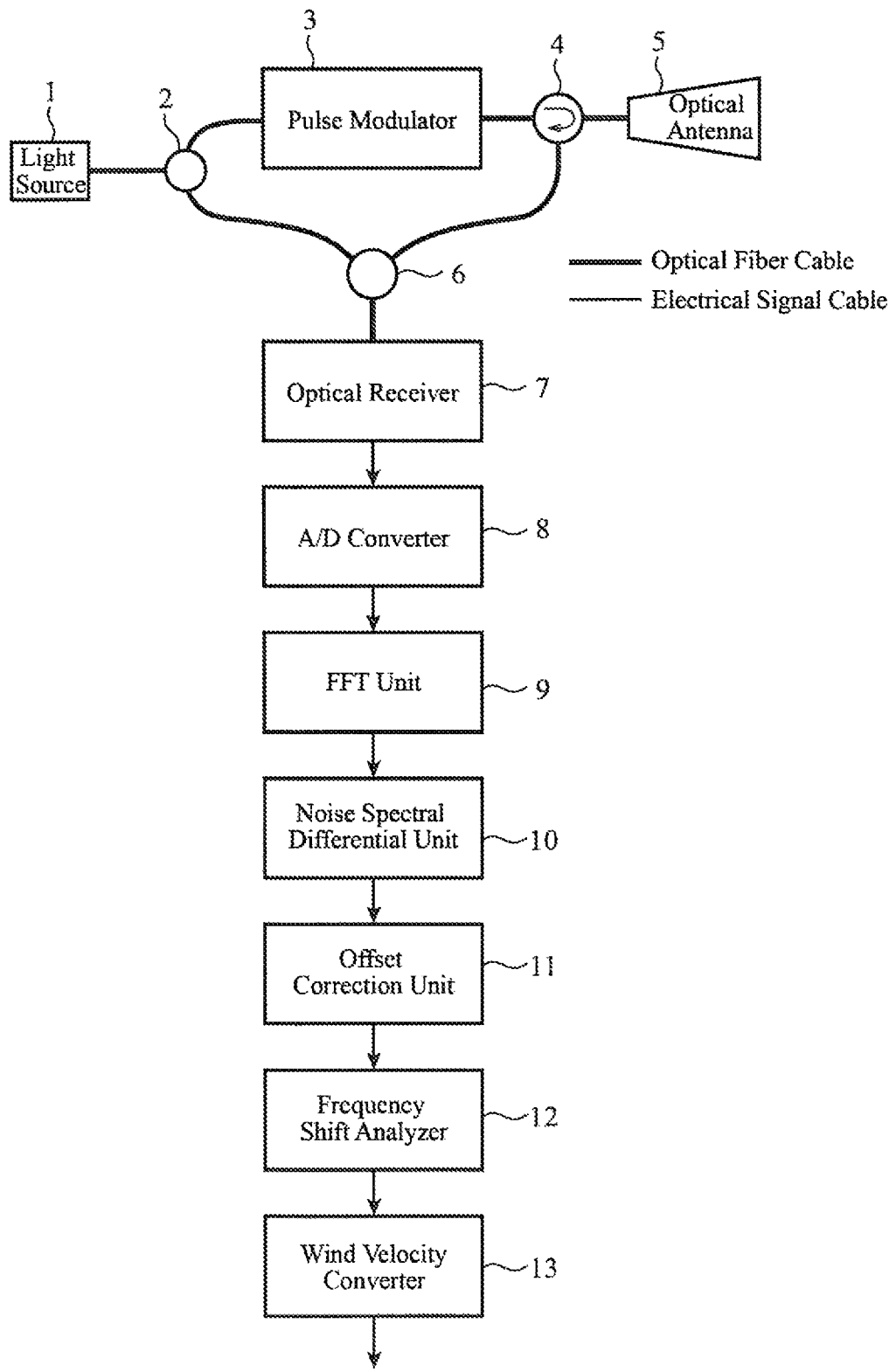
FIG. 1 is a block diagram showing a configuration of a wind measurement coherent lidar of an embodiment 1 in accordance with the present invention.

FIG. 1 is a block diagram showing a configuration of a wind measurement coherent lidar of the embodiment 1 in accordance with the present invention.

In the wind measurement coherent lidar shown in FIG. 1, a light source 1 is connected to an optical distributor 2, and the optical distributor 2 is connected to a pulse modulator 3 and an optical coupler 6. The pulse modulator 3 is connected to an optical circulator 4, and the optical circulator 4 is connected to an optical antenna 5 and the optical coupler 6. The optical coupler 6 is further connected to an optical receiver 7. The optical receiver 7 is connected to an analog-to-digital converter (referred to as A/D converter from now on) 8, and the A/D converter 8 is connected to a Fast Fourier analyzer (referred to as FFT unit from now on) 9. The FFT unit 9 is connected to a noise spectral differential unit 10, and the noise spectral differential unit 10 is connected to an offset corrector 11. The offset corrector 11 is connected to a frequency shift analyzer 12, and the frequency shift analyzer 12 is connected to a wind velocity converter 13.

In addition, as shown by thick lines in FIG. 1, optical circuits such as optical fiber cables connect between the light source 1 and the optical distributor 2, between the optical distributor 2 and the pulse modulator 3, between the optical distributor 2 and the optical coupler 6, between the pulse modulator 3 and the optical circulator 4, between the optical circulator 4 and the optical antenna 5, between the optical circulator 4 and the optical coupler 6, and between the optical coupler 6 and the optical receiver 7.

On the other hand, as shown by thin lines in FIG. 1, electric circuits such as electric signal cables connect between the optical receiver 7 and the A/D converter 8, between the A/D converter 8 and the FFT unit 9, between the FFT unit 9 and the noise spectral differential unit 10, between the noise spectral differential unit 10 and the offset corrector 11, between the offset corrector 11 and the frequency shift analyzer 12, and between the frequency shift analyzer 12 and the wind velocity converter 13.

The light source 1 has a function of transmitting continuous wave light with a single frequency, and the optical distributor 2 is a device that divides the light from the light source 1 into two parts, and delivers a first part to the pulse modulator 3 and a second part to the optical coupler 6. The pulse modulator 3 is a modulator that provides the input light with a prescribed frequency shift, and performs pulse modulation thereof. The optical circulator 4 has a function of delivering the optical signal from the pulse modulator 3 to the optical antenna 5, and the optical signal from the optical antenna 5 to the optical coupler 6. The optical antenna 5 is a transmitting/receiving antenna that transmits the optical signal from the optical circulator 4 into the atmosphere, and delivers the scattered light from the atmosphere to the optical circulator 4 as received light. The optical coupler 6 is an optical multiplexer that multiplexes the optical signals from the optical distributor 2 and the optical circulator 4, and delivers to the optical receiver 7. The optical receiver 7 is a device that converts the optical signal from the optical coupler 6 to an electric signal through heterodyne detection, and delivers it to the A/D converter 8.

The A/D converter 8 is a circuit that performs analog/digital conversion of the electric signal received by the optical receiver 7. The FFT unit 9 is a device that carries out frequency analysis of the received electric signal using Fast Fourier Transform. The noise spectral differential unit 10 is a device that comprises a noise spectral recorder for recording a noise spectrum in a state without any received signal and a noise spectral differential device for subtracting the noise spectrum from the spectrum of the received signal. The noise spectral differential unit 10 records in advance a spectrum received in a state without receiving any scattered light as a noise spectrum, and subtracts the noise spectrum from a spectrum received in a state that receives the scattered light. The offset corrector 11 is a device constituting an offset correcting unit that performs offset correction of the signal spectrum passing through the subtraction of the noise spectrum with respect to the noise level at a frequency separated from the frequency peak position of the received signal by a prescribed value. The offset corrector 11 has a configuration that performs the offset correction on the signal spectrum passing through the subtraction of the noise spectrum in such a manner as to zero the noise level at the frequency position sufficiently separated from the frequency peak position. The frequency shift analyzer 12 is a device that performs the signal processing on the signal spectrum after the offset correction, and constitutes a frequency shift analyzer that measures the frequency shift. The frequency shift analyzer 12 is configured in such a manner as to execute peak detection processing, barycentric operation processing and the like on the signal spectrum after the offset correction, thereby measuring the amount of the frequency shift. The wind velocity converter 13, which constitutes a wind velocity converter unit that carries out wind velocity detection in accordance with the amount of the frequency shift, has a configuration that transforms the amount of the frequency shift to the wind velocity and outputs it.

Next, the operation of the wind measurement coherent lidar of the embodiment 1 will be described.

The light source 1 sends out the continuous wave light with a single frequency, and the optical distributor 2 splits the optical signal into two parts, and delivers the first part to the pulse modulator 3 and the second part to the optical coupler 6. The pulse modulator 3 provides the input light with the prescribed frequency shift, and generates the optical pulses using a modulation signal that has a prescribed pulse width and cycle period. The optical signal consisting of the optical pulses is emitted into the atmosphere through the optical circulator 4 and the optical antenna 5. The optical signal emitted into the atmosphere is scattered with scattering materials such as an aerosol suspended in the atmosphere, and the optical antenna 5 receives the scattered light as the received light. On this occasion, since the scattering materials such as the aerosol move on the wind, the received light has the Doppler shift frequency corresponding to the wind velocity. The received light is delivered to the optical coupler 6 via the optical antenna 5 and the optical circulator 4. The optical coupler 6 multiplexes the continuous wave light from the optical distributor 2 and the received light, and delivers to the optical receiver 7.

Although a method is shown here of generating the pulses by providing the input light with the prescribed frequency shift through the pulse modulator 3 and by using the modulation signal with the prescribed pulse width and cycle period, a configuration is also possible which comprises an acoustooptic device that generates pulses using a modulation signal with a prescribed pulse width and cycle period and provides the prescribed frequency shift, and that is inserted between the optical distributor 2 and the optical coupler 6.

The optical receiver 7 carries out the heterodyne detection of the continuous wave light and the received light, and converts them to a received signal in the electric signal domain. At this time, the frequency of the received signal is equal to the Doppler frequency shift corresponding to the wind velocity. Next, the A/D converter 8 carries out the A/D conversion of the received signal from the optical receiver 7, and delivers the digital signal to the FFT unit 9. The FFT unit 9 performs the FFT on the received digital signal to obtain the received spectrum.

The noise spectral differential unit 10, in the process of emitting the continuous wave light from the light source 1 and obtains the received spectrum using the FFT unit 9, records in advance a received spectrum in a state without emitting the laser light nor without receiving any scattered light as a noise spectrum, and obtains the difference between the received spectrum and the noise spectrum at the time of receiving the scattered light in a dB domain, thereby obtaining the signal spectrum. Furthermore, it converts the intensity level into a linear domain.

As for the noise spectrum to be recorded in advance, it can be measured with time resolution corresponding to one shot of a laser pulse, or can be measured by integrating n times.

Figure 2:
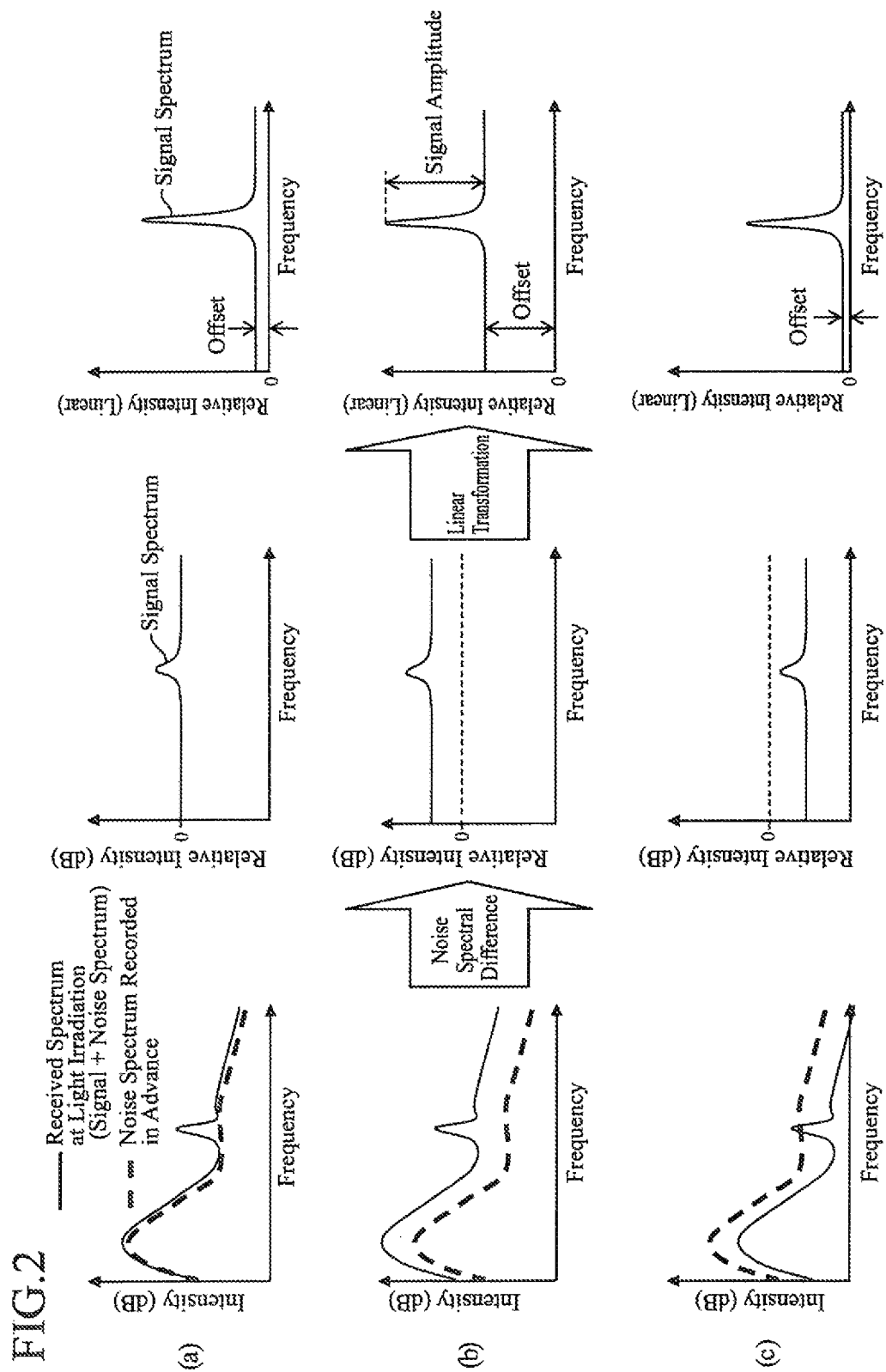
FIG. 2 is a diagram (part one) illustrating the operation from noise spectral difference to offset correction of the wind measurement coherent lidar of the embodiment 1 in accordance with the present invention.
Figure 3:
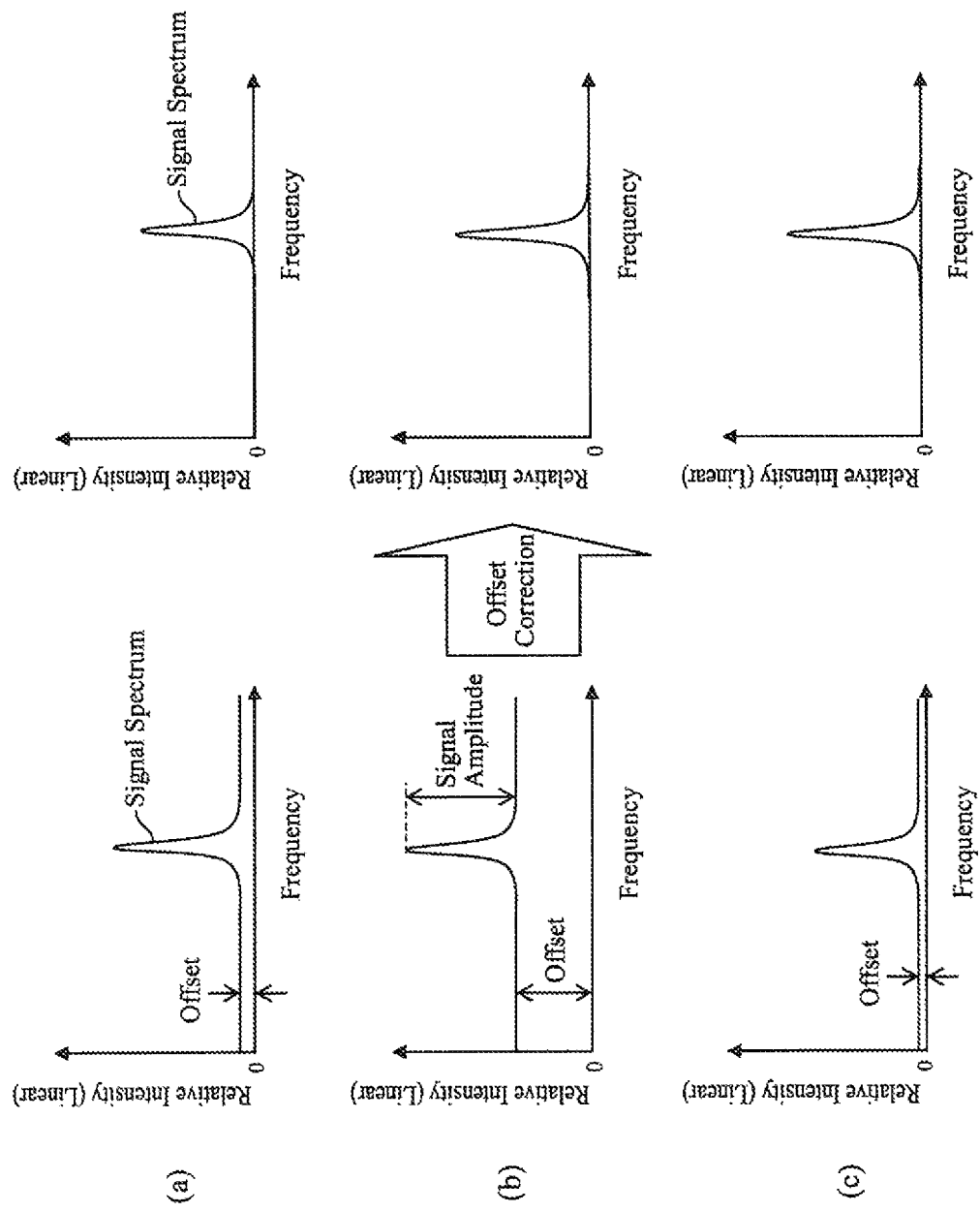
FIG. 3 is a diagram (part two) illustrating the operation from the noise spectral difference to the offset correction of the wind measurement coherent lidar of the embodiment 1 in accordance with the present invention.

FIG. 2 and FIG. 3 are diagrams illustrating the operation from the noise spectral difference to the offset correction. Incidentally, the right end of FIG. 2 and the left end of FIG. 3 show the same diagrams after the linear transformation.

The diagrams on the left end of FIG. 2 show a received spectrum (noise spectrum) when not receiving the scattered light and a received spectrum when receiving the scattered light. In addition, in FIG. 2 and FIG. 3, (a) is an example when the noise level of the received spectrum is nearly equal to the noise spectrum recorded in advance; (b) is an example when the noise level of the received spectrum is higher than the noise spectrum recorded in advance; and (c) is an example when the noise level of the received spectrum is lower than the noise spectrum recorded in advance. These fluctuations occur owing to changes in the temperature and in the power of the light source.

When the noise spectral differential unit 10 subtracts the noise spectrum from the received spectrum, the "shape" of the noise spectrum is corrected and a signal spectrum can be obtained which has an offset superposed on the relative intensity 0 dB. This makes it possible to prevent erroneous detection of the peak frequency of the noise spectrum in the measurement of the peak frequency position in the offset corrector 11 or frequency shift analyzer 12 which will be described later when the intensity of the noise spectrum is higher than the signal spectrum.

The signal spectrum in the linear domain obtained by the noise spectral differential unit 10 has an offset, and furthermore, when the intensity level of the noise spectrum fluctuates with respect to the noise spectrum recorded in advance, the amount of the offset fluctuates. The offset corrector 11 measures an approximate position of the peak frequency by passing the signal spectrum in the linear domain through a correlation filter with a signal spectral shape, obtains the amount of the offset at a frequency position separated sufficiently from the approximate frequency position, and subtracts the amount of the offset from the signal spectrum, thereby obtaining the signal spectrum passing through the offset correction.

Figure 4:
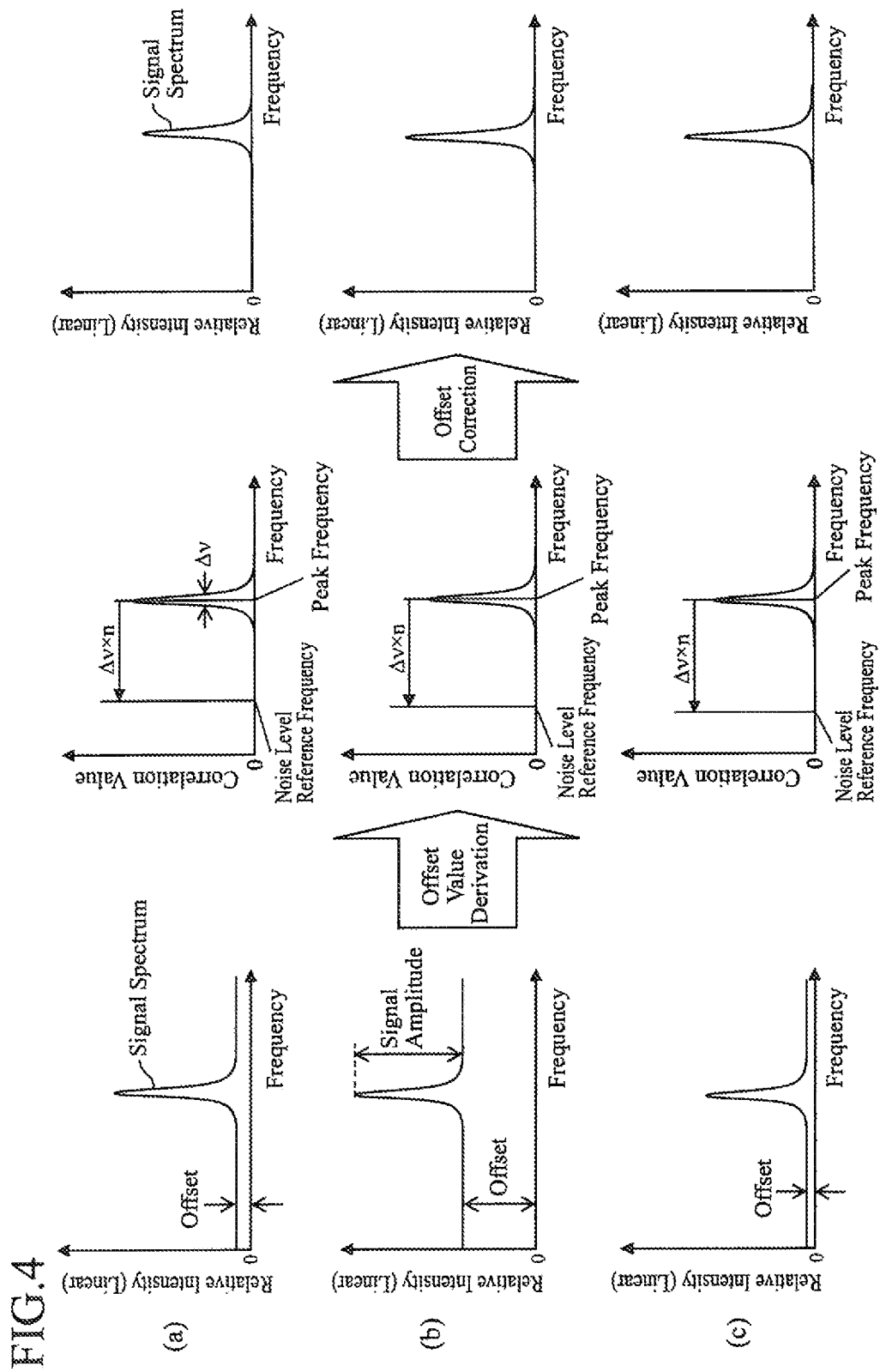
FIG. 4 is a diagram illustrating derivation of an offset value and correction of the offset of the wind measurement coherent lidar of the embodiment 1 in accordance with the present invention.

FIG. 4 is a diagram showing a derivation principle of the peak frequency and the amount of the offset and showing the offset correction in the offset corrector 11, and (a), (b) and (c) show the same cases as those of FIG. 2 and FIG. 3. In the derivation of the amount of the offset, it calculates the correlation value using a filter corresponding to the signal spectral shape. Here, it sets the frequency at which the correlation value becomes maximum as the approximate peak frequency. Next, it refers to the frequency separated from the frequency peak position by Δv*n (n is an integer not less than one) as the offset value and carries out correction, where Δv is the frequency width of the correlation waveform.

Here, as for the derivation of the amount of the offset at the frequency position sufficiently separated from the frequency peak position, it can be obtained from a time average value at a single point or from an average value in a fixed frequency width. In addition, as for the frequency position sufficiently separated from the frequency peak position, the amount of the offset can be calculated in a predetermined frequency band or at the position separated from the frequency peak position measured by a prescribed frequency. In addition, there are some cases of selecting whether to measure the amount of the offset at the frequency position separated toward the higher frequency side or the lower frequency side on the basis of the frequency peak position measured.

Next, the frequency shift analyzer 12 obtains the signal peak frequency by the barycentric operation as to the signal spectrum after the offset correction. Furthermore, the wind velocity converter 13 calculates the wind velocity from the laser frequency and the peak frequency.

Here, as for the frequency range in which the barycentric operation is performed, it can be the entire frequency domain, or only in a surrounding region of the frequency peak position obtained by the offset corrector 11 to reduce the load of the signal processing.

Here, when the noise spectrum has frequency characteristics, when the received spectrum that does not passing through the subtraction of the noise spectrum undergoes linear transformation, and when the frequency peak is detected by the barycentric operation, the barycentric operation is affected by noise and the frequency peak is detected at a position deviated from the true value of the frequency peak position. Thus, the amount of the frequency shift measured has an error, resulting in a failure of the accurate wind velocity measurement.

In addition, even if the signal spectrum is derived by subtracting the noise spectrum from the received spectrum, if the intensity level of the noise spectrum has fluctuations, the signal spectrum in the linear domain has an offset. Here, the barycenter of the signal peak position is generally derived from a primary moment of the signal spectrum defined by the following expression:

$$f_g = \frac{\sum x(f) \cdot f}{\sum x(f)}$$

where fg is the barycentric position, f is a frequency, and x is the amplitude at each frequency. Accordingly, when the offset is large compared with the amplitude of the signal spectrum, the barycentric position cannot be derived accurately. In other words, the amount of the frequency shift measured has an error and the accurate wind velocity measurement cannot be carried out.

In contrast with this, as for the wind measurement coherent lidar of the embodiment 1, even if the noise spectrum has the frequency characteristics and the intensity level of the noise spectrum has fluctuations, it derives the signal spectrum by subtracting the noise spectrum from the received spectrum, and further performs the offset correction on the signal spectrum in the linear domain, thereby being able to detect the frequency peak position of the signal spectrum at high accuracy through the barycentric operation. In other words, it can measure the amount of the frequency shift accurately and achieve highly accurate wind velocity measurement.

Furthermore, even if the noise spectrum has the frequency characteristics and the intensity level of the noise spectrum has fluctuations, the lidar derives the signal spectrum by subtracting the noise spectrum from the received spectrum, and performs the offset correction on the signal spectrum in the linear domain, thereby being able to detect the frequency width of the signal spectrum accurately using the secondary moment defined by the following expression.

$$f^2 = \frac{\sum x(f) \cdot f^2}{\sum x(f)}$$

This enables estimating the turbulence in the wind field to be measured.

In addition, since the wind measurement coherent lidar of the embodiment 1 records the noise level and the signal level (frequency peak level of the received signal) for each measurement, even if the noise level fluctuates, it can derive the received signal-to-noise ratio (referred to as "received SN ratio" from now on) at the measurement accurately. Generally, when the noise is white noise, and if the received SN ratio is low, the dispersion of the signal intensity is large and the detection accuracy of the frequency peak position has dispersion as well. Accordingly, this makes it possible to obtain an index to the reliability and accuracy of the frequency peak position (wind velocity value) detected from the received SN ratio.

As described above, according to the wind measurement coherent lidar of the embodiment 1, in a wind measurement coherent lidar that emits laser light with a single frequency into the atmosphere and receives the laser light, and that carries out wind velocity detection from the received signal obtained through heterodyne detection, the wind measurement coherent lidar comprises: the noise spectral recorder that records the noise spectrum in the state without the received signal; the noise spectral differential unit that subtracts the noise spectrum from the spectrum of the received signal; the offset corrector that performs offset correction of a signal spectrum, which is obtained by subtracting the noise spectrum, with respect to the noise level at the frequency separated from a frequency peak position of the received signal by a prescribed value; the frequency shift analyzer that measures the frequency shift by performing signal processing of the signal spectrum after the offset correction; and the wind velocity converter that detects wind velocity from an amount of the frequency shift. Accordingly, it can carry out the wind velocity measurement at high accuracy even if the noise spectrum has level fluctuations.

Incidentally, it is to be understood that variations of any components of the individual embodiments or removal of any components of the individual embodiments is possible within the scope of the present invention.

INDUSTRIAL APPLICABILITY

A wind measurement coherent lidar in accordance with the present invention is configured in such a manner as to record a noise spectrum in a state without any received signal, to subtract the noise spectrum from the spectrum of the received signal, and to perform the offset correction of the signal spectrum with respect to the noise level at a frequency separated from the frequency peak position by a prescribed value. Accordingly, even if the noise spectrum has level fluctuations, it can carry out wind velocity measurement at high accuracy. Accordingly, it is suitable for an application to a wind measurement coherent lidar that measures wind velocity in the atmosphere.

DESCRIPTION OF REFERENCE SYMBOLS 1 light source; 2 optical distributor; 3 pulse modulator; 4 optical circulator; 5 optical antenna; 6 optical coupler; 7 optical receiver; 8 A/D converter; 9 FFT unit; 10 noise spectral differential unit; 11 offset correction unit; 12 frequency shift analyzer; 13 wind velocity converter.

What is claimed is:

1. A wind measurement coherent lidar that emits laser light with a single frequency into an atmosphere and receives the laser light, and that carries out wind velocity detection from a received signal obtained through heterodyne detection, the wind measurement coherent lidar comprising:
    a noise spectral recorder that records a noise spectrum in a state without emitting the laser light;
    a noise spectral differential unit that subtracts the noise spectrum from a spectrum of the received signal;
    an offset corrector that
        obtains an offset amount at a frequency position separated by a prescribed value from a frequency peak position of a signal spectrum, said signal spectrum having been obtained as a result of the subtraction by the noise spectral differential unit, and
        performs offset correction on the signal spectrum with respect to a noise level by subtracting the offset amount from the signal spectrum;
    a frequency shift analyzer that measures a frequency shift by performing signal processing of the signal spectrum after the offset correction; and
    a wind velocity converter that detects wind velocity from an amount of the frequency shift.

2. The wind measurement coherent lidar according to claim 1, wherein the noise spectral differential unit subtracts the noise spectrum in a dB domain.

3. The wind measurement coherent lidar according to claim 2, wherein
    the noise spectral differential unit converts intensity of the signal spectrum, which is the result of the subtraction, from the dB domain into a linear domain, and
    the frequency shift analyzer measures the frequency shift by performing a barycentric operation on the signal spectrum on which the offset correction has been performed.

4. The wind measurement coherent lidar according to claim 1, wherein the offset corrector determines, depending on the frequency peak position, which of a higher frequency side and a lower frequency side from the frequency peak position is used for obtaining the offset amount.

5. The wind measurement coherent lidar according to claim 1, wherein the offset corrector obtains the offset amount at a frequency position separated by an integral multiple of a frequency width of a correlation waveform whose maximum amplitude indicates the frequency peak position.

* * * * *